US012695677B2

(12) United States Patent
Feng et al.

(10) Patent No.: US 12,695,677 B2
(45) Date of Patent: Jul. 28, 2026

(54) IDENTIFYING VISUALIZATIONS BASED ON NATURAL LANGUAGE SEARCH

(71) Applicant: Cisco Technology, Inc., San Jose, CA (US)

(72) Inventors: Chloe Elizabeth Feng, Alameda, CA (US); Barry Glenn Becker, Union City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 9 days.

(21) Appl. No.: 18/798,028

(22) Filed: Aug. 8, 2024

(65) Prior Publication Data

US 2026/0081844 A1     Mar. 19, 2026

(51) Int. Cl.
| | |
|---|---|
| *H04L 41/16* | (2022.01) |
| *H04L 41/069* | (2022.01) |
| *H04L 43/045* | (2022.01) |

(52) U.S. Cl.
CPC ............ *H04L 41/16* (2013.01); *H04L 41/069* (2013.01); *H04L 43/045* (2013.01)

(58) Field of Classification Search
CPC ...... H04L 41/16; H04L 41/069; H04L 43/045
USPC ........................................................ 709/224
See application file for complete search history.

(56) References Cited

U.S. PATENT DOCUMENTS

| | | | | |
|---|---|---|---|---|
| 11,911,200 | B1 * | 2/2024 | Alpert .................... | G16H 30/40 |
| 11,973,784 | B1 | 4/2024 | Erlingsson et al. | |

| | | | | |
|---|---|---|---|---|
| 2020/0104401 | A1 | 4/2020 | Burnett et al. | |
| 2020/0134103 | A1 | 4/2020 | Mankovskii | |
| 2024/0104147 | A1 | 3/2024 | Yanamandra et al. | |
| 2025/0077582 | A1 * | 3/2025 | Tea ................... | G06F 16/24578 |
| 2025/0111073 | A1 * | 4/2025 | Ho ...................... | G06F 21/6218 |
| 2025/0190449 | A1 * | 6/2025 | Zhang .................. | G06F 16/288 |
| 2025/0190470 | A1 * | 6/2025 | Khullar .............. | G06F 16/3347 |
| 2025/0259715 | A1 * | 8/2025 | Crabtree ............... | G16C 20/80 |

FOREIGN PATENT DOCUMENTS

| | | | | |
|---|---|---|---|---|
| WO | WO-2024249710 A1 * | 12/2024 | ............. | G06N 5/022 |

OTHER PUBLICATIONS

Hoque E., et al., "Searching the Visual Style and Structure of D3 Visualizations", arXiv:1907.11265v2, Oct. 15, 2019, pp. 1-14.

Ko H-K., et al., "Natural Language Dataset Generation Framework for Visualizations Powered by Large Language Models", CHI '24, May 11-16, 2024, Honolulu, HI, USA, pp. 1-22.

(Continued)

*Primary Examiner* — Lan Dai T Truong

(74) *Attorney, Agent, or Firm* — Edell, Shapiro & Finnan, LLC

(57) ABSTRACT

Methods for allowing users to find relevant existing real-time data visualizations based on natural language rendering of configuration settings. Specifically, methods involve obtaining a natural language query related to performance of at least one enterprise service and selecting one or more real-time data visualizations from a plurality of existing real-time data visualizations by applying artificial intelligence or machine learning model to the natural language query. The methods further involve providing the one or more real-time data visualizations indicative of the performance of the at least one enterprise service.

20 Claims, 8 Drawing Sheets

(56)                    References Cited

OTHER PUBLICATIONS

Microsoft, "Get started with Copilot in Excel," Copilot Lab, retrieved from https://support.microsoft.com/en-us/office/get-started-with-copilot-in-excel-d7110502-0334-4b4f-a175-a73abdfc118a, on Apr. 30, 2024, 4 pages.

Oppermann M., et al., "VizCommender: Computing Text-Based Similarity in Visualization Repositories for Content-Based Recommendations", arXiv:2008.07702v1, Aug. 18, 2020, 11 Pages.

Shi D., et al., "Calliope: Automatic Visual Data Story Generation from a Spreadsheet", arXiv:2010.09975v1, Oct. 20, 2020, 11 Pages.

Joty S., et al., "NLP+Vis: NLP Meets Visualization", Half-day Tutorial, EMNLP 2023, Tutorial Overview—Introduction, Dec. 2023, 28 Pages.

Joty S., et al., "NLP+Vis: NLP Meets Visualization", Half-day Tutorial, EMNLP 2023, Tutorial Overview—NLP + Vis Applications, Dec. 2023, 61 Pages.

* cited by examiner

402 CONFIGURING REAL-TIME DATA VISUALIZATION

404 GENERATING VISUALIZATION METADATA

406 STORING VISUALIZATION METADATA IN A METADATA STORAGE

408 TRAINING LLM BY APPLYING A COLLECTION OF DESCRIPTIONS

400

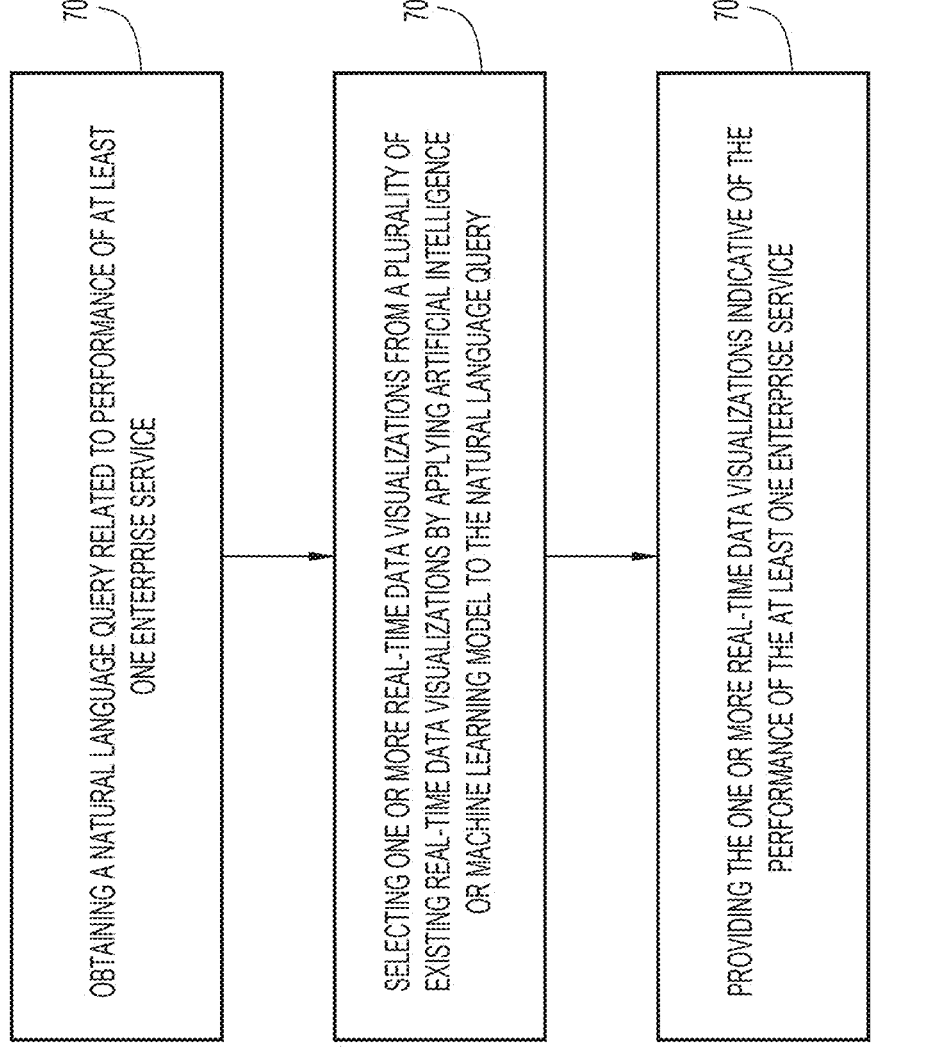

702

OBTAINING A NATURAL LANGUAGE QUERY RELATED TO PERFORMANCE OF AT LEAST ONE ENTERPRISE SERVICE

704

SELECTING ONE OR MORE REAL-TIME DATA VISUALIZATIONS FROM A PLURALITY OF EXISTING REAL-TIME DATA VISUALIZATIONS BY APPLYING ARTIFICIAL INTELLIGENCE OR MACHINE LEARNING MODEL TO THE NATURAL LANGUAGE QUERY

706

PROVIDING THE ONE OR MORE REAL-TIME DATA VISUALIZATIONS INDICATIVE OF THE PERFORMANCE OF THE AT LEAST ONE ENTERPRISE SERVICE

IDENTIFYING VISUALIZATIONS BASED ON NATURAL LANGUAGE SEARCH

TECHNICAL FIELD

The present disclosure generally relates to computer networks and systems.

BACKGROUND

Enterprise networks include many assets and involve various enterprise service functions for equipment and software. Enterprise networks and services are often managed by a team of information technology (IT) specialists. This is particularly the case for enterprises that have many enterprise services and large networks or systems of numerous instances and types of equipment and software (network services). Tracking performance, troubleshooting, and integrating new technology and/or updates for networking or equipment and software in large enterprise networks is time consuming and often involves reviewing massive amounts of telemetry data, which may be visualized to IT specialists in a form of charts, tables, and/or graphs.

BRIEF DESCRIPTION OF THE DRAWINGS

FIG. 7 is a flowchart illustrating a computer-implemented method of providing one or more real-time data visualizations selected from a plurality of real-time data visualizations using artificial intelligence or machine learning model based on a natural language query, according to an example embodiment.

DETAILED DESCRIPTION

Overview

Figure 1:
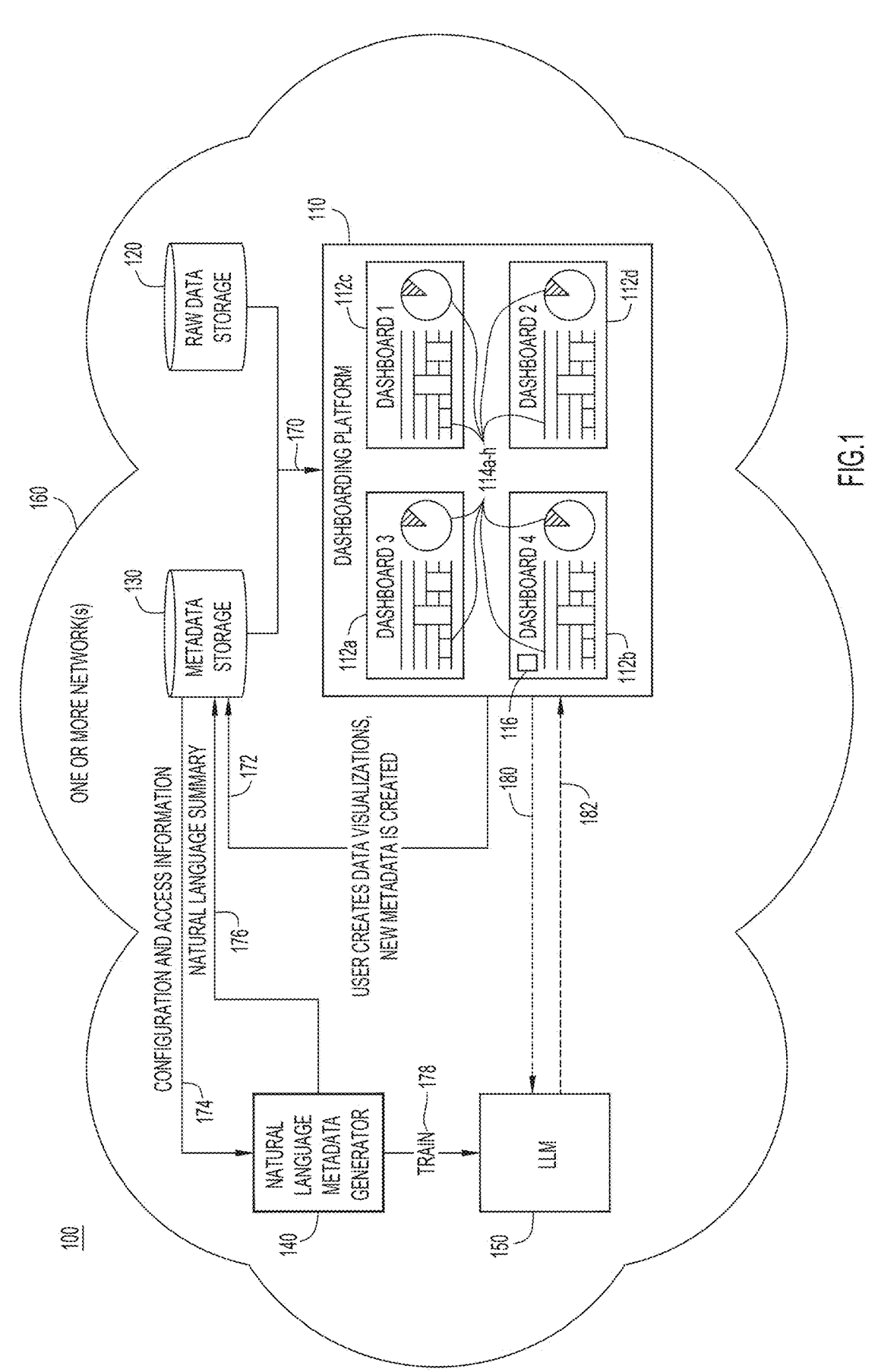
FIG. 1 is a diagram illustrating a system configured to train a large language model to select real-time data visualizations based on a natural language query, according to an example embodiment.

Techniques presented herein allow users to find relevant existing real-time data visualizations based on natural language rendering of configuration settings.

In one form, methods involve obtaining a natural language query related to performance of at least one enterprise service and selecting one or more real-time data visualizations from a plurality of existing real-time data visualizations by applying artificial intelligence or machine learning model to the natural language query. The methods further involve providing the one or more real-time data visualizations indicative of the performance of the at least one enterprise service.

Example Embodiments

To help users track performance of enterprise services (e.g., enterprise provided services and/or network services), troubleshoot, integrate new service and/or update networking or equipment and software (perform configuration actions), telemetry data is often provided in a format of visual representations. Based on these visual representations, insights may be formed and configuration actions may be performed to improve performance of an enterprise service.

Performance of an enterprise service may be improved by, for example, troubleshooting and resolving network issue(s) or problem(s). That is, equipment and software may encounter various issues. In one example embodiment, these issues may involve network related problems or potential problems. Network related problems may be outages, latencies, connectivity problems, malfunctions of network device(s) or software thereon, and/or incompatibility or configuration related problems. In one example embodiment, issues may involve defects, obsolescence, configurations, workarounds, network patches, etc.

Telemetry data, sometimes called "collection data" or "measurement data", are values obtained from monitoring i.e., monitoring, by a monitoring agent, performance of one or more services e.g., web pages, web applications, enterprise services, monitoring service or agent(s) itself, network(s), etc. Telemetry data includes various information such as identifiers, timestamps, measured values, key performance indicators (KPIs), etc. Telemetry data includes performance related data, analytics data, diagnostic data, etc. Based on telemetry data, network-related issues such as latency or poor performance of an enterprise service are detected. Telemetry data may be gathered from various data sources and may be referred to as "raw data".

To help users understand, analyze, and/or correlate telemetry data, real-time data visualizations are created. Real-time data visualizations provide telemetry data, which may be streamed in real-time, in a form of charts (e.g., waterfall charts of pageload tests), tables, graphs, gauges, images (e.g., network topology with various latencies in real-time), etc. Multiple real-time data visualizations may form a dashboard (i.e., a user interface). The dashboard may be a tool that displays live telemetry data in a visual format i.e., streams telemetry data to an observability platform. Typically, a dashboard includes a set of related real-time data visualizations.

Users may create real-time data visualizations of different types of telemetry data that are indicative of a particular aspect of an enterprise service (e.g., network latency, performance, loading speed, etc.). Users may also create dashboards by combining real-time data visualizations. Typically, these combined real-time data visualizations are related to one another e.g., to troubleshoot a specific network problem. That is, each dashboard may be specific to a service related problem or an incident being analyzed (e.g., troubleshooting). In one example, same telemetry data may be represented in various visual formats e.g., graph(s) and chart(s).

As complexities of the enterprise networks and services grow, more and more dashboards (with various real-time data visualizations) are generated. The vast amount of existing real-time data visualizations makes it increasingly difficult to find a specific real-time data visualization. As such, users may create new dashboards, thus causing redundancies. When new dashboards are created, the problem of finding the specific real-time data visualization is further exacerbated by increasing amount of real-time data visualizations to be searched and by analyzing redundant dashboards to determine relevancy.

Moreover, it is difficult to search for real-time data visualizations. These searches may be labor intensive and/or time intensive. Using image recognition techniques in which images of the visual representations are semantically analyzed for finding specific real-time data visualization(s) are complex, time consuming, and may be inaccurate.

Selecting specific real-time data visualization(s) based on user input alone and without image recognition may be difficult, if not impossible. For example, users may want to find a specific graphical representation (real-time data visualization) of a problem they are trying to solve or of an incident they are looking to troubleshoot. Users may already have existing graphs (i.e., existing real-time data visualizations) of the problem they want to solve but they are not likely to spend time describing each of these graphs (no user-provided descriptions) when initially creating and configuring them. As such, the specific graphical representation will not be found because there is no description of it. In related art, existing real-time data visualizations typically lack descriptive metadata and only include graphical settings (configuration information), which alone is not enough to locate the specific visualization.

Moreover, users think about a problem to troubleshoot in a natural language. As such, user input typically lacks information for finding the target real-time data visualization(s). In other words, user input cannot be used to search through graphical settings (configuration information).

The techniques presented herein allow users to find target or specific real-time data visualization(s) from multiple existing real-time data visualization based on natural language queries. That is, the techniques presented herein identify, find, and/or select real-time data visualizations (e.g., visual representation(s) for the problem to troubleshoot) based on a natural language input. Natural language input is human language and may involve keywords, sentences, and/or other attributes in natural language.

The techniques presented herein generate a natural language summary based on configuration settings of real-time data visualization in response to creating this real-time data visualization. The natural language summary is then included as part of metadata for this real-time data visualization. Natural language summaries are then used to train an artificial intelligence or machine learning model to select relevant real-time data visualization(s).

The techniques presented herein involve obtaining a natural language query related to performance of at least one enterprise service and selecting one or more real-time data visualizations from a plurality of existing real-time data visualizations by applying artificial intelligence or machine learning model to the natural language query. The selected real-time data visualization(s) that are indicative of the performance of the at least one enterprise service, are then provided to the user e.g., via a dashboard platform or an observability platform.

As such, specific real-time data visualization may be selected quickly and accurately without using image recognition. Moreover, specific real-time data visualizations may be selected from multiple existing real-time data visualizations stored in various datastores based on natural language user query by applying artificial intelligence or machine learning.

While one or more example embodiments are described with respect to network-related service or issue, the disclosure is not limited thereto. Real-time data visualizations may relate to data analytics, data management, etc. (collectively referred to as "enterprise services"), depending on a particular deployment and use case scenario.

Moreover, while one or more example embodiments are described with respect to a large language model (LLM), this is just an example and the disclosure is not limited thereto. Another artificial intelligent or machine learning model may be deployed depending on a particular use case scenario. Some non-limiting examples of artificial intelligence or machine learning models include unsupervised machine learning, supervised machine learning, deep neural networks, recurrent neural networks, generative pre-trained transformers (GPT), bidirectional encoder representations from transformers (BERT), text-to-text transfer transformers (T5). Artificial intelligence or machine learning models are typically trained using specialized hardware such as graphic processing units (GPUs) and/or tensor processing units (TPUs), which may be part of a processor discussed in FIG. 8.

FIG. 1 is a block diagram illustrating a system 100 configured to train a large language model to select real-time data visualizations based on a natural language query, according to an example embodiment. The system 100 includes a dashboarding platform 110, a raw data storage 120, a metadata storage 130, a natural language metadata generator 140, and a large language model (LLM 150). Entities of the system 100 are connected to one another, via one or more network(s) 160.

In various example embodiments, the entities of the system 100 (the dashboarding platform 110, the raw data storage 120, the metadata storage 130, the natural language metadata generator 140, and the LLM 150) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) such as the one or more network(s) 160. Each entity may include internal and external hardware components such as those depicted and described in further detail in FIG. 8. In one example, at least some of these entities may be embodied as virtual devices with functionality distributed over a number of hardware devices such as virtual switches, routers, in a cloud, etc.

The one or more network(s) 160 include a plurality of network devices, which are transport nodes (e.g., switches, routers, leaf nodes, spine nodes, etc.) configured to transmit network communications between entities of the system 100. The one or more network(s) 160 may include internal communication networks and/or external communication networks such as the Internet.

The dashboarding platform 110 may be a web-based service running on one or more servers and is configured to provide a plurality of dashboards 112*a-d* (e.g., a first dashboard 112*a*, a second dashboard 112*b*, a third dashboard 112*c*, and a fourth dashboard 112*d*). The plurality of dashboards 112*a-d* may be strategic dashboards, tactical dashboards, operational dashboards, and/or analytical dashboards. Each dashboard may include various visual representations such as real-time data visualizations 114*a-h* and a new real-time data visualization 116 that is in a process of being created. The real-time data visualizations 114*a-h* and the new real-time data visualization 116 may be graphs, pie charts, bar charts, waterfall charts, line charts, tables, images, etc.

The notations 1, 2, 3, . . . n; a, b, c, . . . n; "a-n", "a-d", "a-f", "a-h", "a-k", "a-c", and the like illustrate that the number of elements can vary depending on a particular implementation and is not limited to the number of elements being depicted or described. Moreover, these are examples of various components, and the number and types of components, functions, etc. may vary based on a particular deployment and use case scenario.

Users may access the dashboarding platform 110 using their user equipment or an endpoint device such as a desktop computer, a laptop computer, a tablet computer, a smartphone, or the like. The user equipment may be a computing device such as a computing device of FIG. 8. The user equipment is configured to execute a client application that provides a user interface (UI) e.g., a web browser to access the dashboarding platform 110.

The dashboarding platform 110 may be a standalone application executing on user equipment. In one example embodiment, the dashboarding platform 110 may be an observability platform that is being executed by one or more server(s) such as the computing device in FIG. 8. The dashboarding platform 110 may be a web application or a web-based service running in a datacenter or cloud computing environment. The dashboarding platform 110 is configured to display the plurality of dashboards 112*a-d*.

The dashboarding platform 110 is further configured to create one or more real-time data visualization(s) and form dashboard(s) based on user input. The dashboarding platform 110 allows the user to design a dashboard and/or real-time data visualization, which is then stored in the metadata storage 130 (graphical settings or configuration data). The dashboarding platform 110 is further configured to obtain (stream) real-time telemetry data from the raw data storage 120 and generate real-time data visualization based on the telemetry data and respective metadata stored in the metadata storage 130.

The dashboarding platform 110 may further be configured to correlate various telemetry data e.g., web performance telemetry data to other application performance management data. The dashboarding platform 110 may also generate alerts based on the telemetry data obtained in real-time (poor performance alerts). In one example embodiment, the dashboarding platform 110 may be driven by human and digital intelligence that serves as a one-stop destination for equipment and software of an enterprise to access insights and expertise when employed. Examples of capabilities include cases (errors or issues to troubleshoot), automation workbench, insights with respect to various network equipment, network service(s), and/or enterprise service(s). Various users (e.g., IT specialists) may interact with the dashboarding platform 110 to manage equipment and software of the enterprise and monitor performance of an enterprise network and/or enterprise service(s).

Based on one or more real-time data visualizations indicative of performance of at least one enterprise service, actionable insights may be generated including recommendations and/or a set of configuration actions to be performed with respect to the enterprise network. A set of configuration actions are one or more operations that change one or more configurations in the enterprise networks and/or network devices. Actionable insights may be specifically tailored to modify configurations of one or more enterprise services e.g., remove an object from a webpage, reroute access to an object, enable or disable a port of a network device, etc. In one example, at least some of the configuration actions may be performed by the dashboarding platform 110 (with or without a network controller) such as changing a configuration of a particular network asset, updating software asset to a newer version, resolving network issues of a particular enterprise service, etc. The user may then be notified that these automated configuration actions were performed.

The raw data storage 120 is configured to store telemetry data. The raw data storage 120 may involve multiple external datastores that store various types of telemetry data. The telemetry data may be streamed to the raw data storage 120 in real-time from one or more data sources.

For example, network/computing equipment and software may send telemetry data directly to the raw data storage 120, via telemetry techniques. Telemetry data may involve their operational status and configurations. The raw data storage 120 is thus continuously updated about the operational status, configurations, software versions, etc. of each instance of the network/computing equipment and software of an enterprise network.

As another example, monitoring agents (e.g., synthetic agents, synthetic tracing agents, synthetic web agents, etc.) run synthetic tests (e.g., performance page load test, network latency test, etc.). These monitoring agents gather telemetry data based on one or more synthetic tests and/or by monitoring performance of an enterprise service and/or device and generate telemetry data, which is then stored in the raw data storage 120. The telemetry data may be retrieved from the raw data storage 120 and visualized to the user as one of real-time data visualizations 114*a-h* based on respective metadata from the metadata storage 130.

Specifically, the metadata storage 130 stores metadata for each real-time data visualization. When a user creates the new real-time data visualization 116 e.g., a waterfall chart, the dashboarding platform 110 generates metadata, which is then stored in the metadata storage 130. The metadata includes configuration information, access information, and a natural language summary generated by the natural language metadata generator 140.

While an example embodiment describes the user creating the new real-time data visualization 116, the disclosure is not limited thereto. For example, the user may be updating an existing real-time data visualization by adding, deleting, or modifying some of the parameters. Based on a change in the configuration information for the real-time data visualization, the metadata is also updated including the natural summary.

The natural language metadata generator 140 obtains configuration and access information (metadata) for a respective real-time data visualization from the metadata storage 130 and generates a natural language summary based on the received metadata. Specifically, the natural language metadata generator 140 analyzes the configuration data and any user-provided descriptions or settings and generates a natural language summary that describes the real-time data visualization in a natural language e.g., keywords, sentences, natural language attributes, an example of which is described in FIGS. 2-4.

Additionally, the natural language metadata generator 140 provides metadata (the identifiers of the second dashboard 112*b* and the new real-time data visualization 116, the type of the new real-time data visualization 116, the location of the new real-time data visualization 116, and the natural language summary generated by the natural language metadata generator 140) to the LLM 150 for training. The LLM 150 learns the natural language summaries to provide corresponding real-time data visualizations when queried by the user. The LLM 150 may be trained to provide an identifier, a type of visualization (graph, chart, etc.), and a location of the specific real-time data visualization(s) that matches user's natural language query. The LLM 150 is trained using the natural language summaries and does not perform any image recognition. As such, the speed of selecting relevant real-time data visualizations is improved. In one example, the LLM 150 may display the selected dashboard and the real-time data visualizations of this selected dashboard. As another example, the LLM 150 may select one real-time data visualization from one dashboard and another real-time data visualization from another dashboard and display these selected real-time data visualizations on the user interface, an example of which is described in FIGS. 5 and 6.

Specifically, at 170, the dashboarding platform 110 uses telemetry data from the raw data storage 120 and corresponding metadata from the metadata storage 130 to provide the dashboards 112*a-d*.

The user may modify one of the dashboards e.g. the second dashboard 112*b* or design a new one. In the system 100, the user may add the new real-time data visualization 116 to the second dashboard 112*b*. In response to creating the new real-time data visualization 116, the dashboarding platform 110 generates metadata, which is then stored in the metadata storage 130, at 172.

In addition to storing the new metadata in the metadata storage 130, the new metadata (i.e., the configuration and access information e.g., uniform resource locator (URL)) is provided to the natural language metadata generator 140, at 174. The natural language metadata generator 140 generates a corresponding natural language summary based on the configuration information.

At 176, the natural language metadata generator 140 provides the natural language summary to the metadata storage 130. The metadata storage 130 stores the metadata (including the natural language summaries) in the metadata storage 130.

Additionally, at 178, the natural language summary along with other metadata is provided to the LLM 150 for training (e.g., from the natural language metadata generator 140). In one example embodiment, the metadata is provided from the metadata storage 130 to the LLM 150. By training the LLM 150 on the metadata that includes natural language summaries (e.g., using a feedback loop), the LLM 150 learns to select real-time data visualization based on a natural language query (user input in a form of keywords, sentences, natural language attributes). An example of operations 172-178 is described in FIGS. 2-4.

At 180, a user may input a natural language search query to the dashboarding platform 110, which is provided to the LLM 150. Based on the training of the LLM 150, the LLM 150 uses the metadata stored in the metadata storage 130 and selects the one or more real-time data visualizations that meet the natural language query by applying AI learning. The LLM 150 may use the generated natural language summaries for matching visualizations with the natural language query.

At 182, the LLM 150 may provide the one or more selected real-time data visualizations and/or a list of relevant visualizations, which are selected from a plurality of existing real-time data visualizations. An example of operations 180 and 182 is described in FIGS. 5 and 6.

Figure 2:
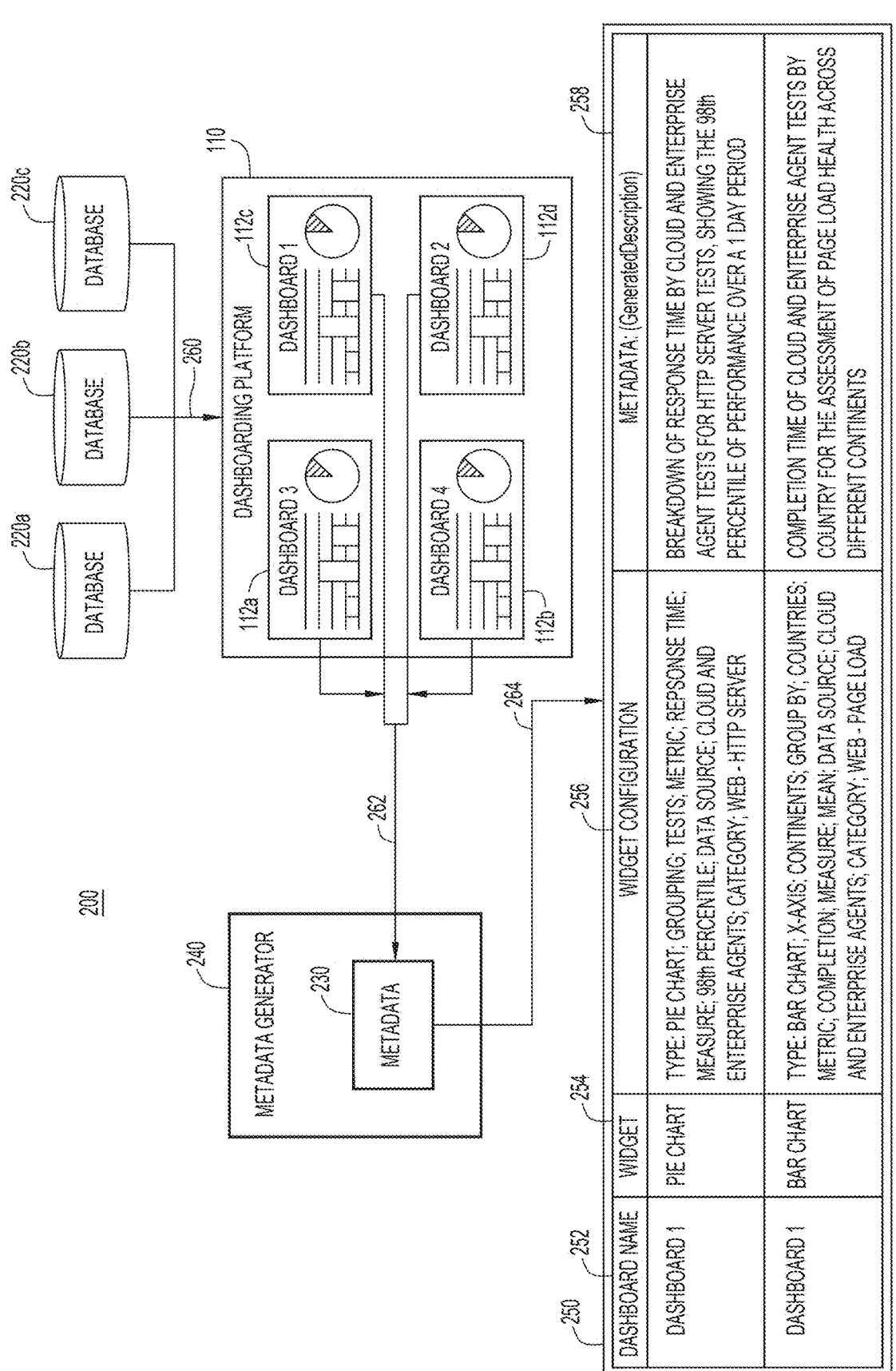
FIG. 2 is a diagram illustrating a summary generation process in which metadata is generated that includes a natural language summary, according to an example embodiment.

With continued reference to FIG. 1, FIG. 2 is a diagram illustrating a summary generation process 200 in which metadata is generated that includes a natural language summary, according to an example embodiment. The summary generation process 200 may be performed by a metadata generator 240 such as the natural language metadata generator 140 of FIG. 1. The summary generation process 200 may involve entities such as the dashboarding platform 110 of FIG. 1 and a plurality of datastores or data sources (e.g., a first database 220*a*, a second database 220*b*, and a third database 220*c*) that store raw data (telemetry data). The datastores may be the raw data storage 120 of FIG. 1. The summary generation process 200 generates metadata 250 with natural language summaries.

The summary generation process 200 involves at 260, the dashboarding platform 110 obtaining raw data (telemetry data). Users may use the dashboarding platform 110 to create one or more real-time data visualizations and form dashboards therefrom. In example of FIG. 2, users design the first dashboard 112*a*, the second dashboard 112*b*, the third dashboard 112*c*, and the fourth dashboard 112*d*. As the users create these dashboards 112*a-d*, configuration data is generated, which is added as metadata 230 along with user-provided settings. Additionally, the metadata 230 includes an identifier and a type of the respective real-time data visualization, which may be generated by the dashboarding platform 110. The metadata 230 also includes access information such as a location of this visualization or a uniform resource locator (URL).

At 262, the metadata 230 (configuration data, user-provided settings, and a respective location) is provided to the metadata generator 240. The metadata generator 240 analyzes the metadata 230 and generates the metadata 250 with natural language summaries. An example of generating a natural language summary is described in FIG. 3.

The metadata 250 with the natural language summaries may include a name 252 for each of the first dashboard 112*a*, the second dashboard 112*b*, the third dashboard 112*c*, and the fourth dashboard 112*d*, a type of visualization referred to as a widget 254, configuration data (widget configuration 256), and a natural language summary (generated description 258). In one example embodiment, the metadata 230 may further includes enterprise information and other attributes of the respective real-time data visualization.

The name 252 may be an example of a user-provided setting. For example, the first dashboard 112*a* may be named by the user as "Dashboard 1". Other user-provided settings and descriptions are within the scope of the disclosure and the name 252 is just one example. Other user-provided settings may involve a name for each real-time data visualization e.g., widget 1, 2, etc., a type of visualization, a name or an identifier for the x-axis, y-axis, etc.

The widget 254 identifies a type of real-time data visualization. For example, the dashboard 1 includes a pie chart and the dashboard 2 includes a bar chart.

The widget configuration 256 may include a type of the widget and information about telemetry data and data sources. For example, for dashboard 1, the widget configuration 256 may include information such as type: pie chart; grouping: tests; metric: response time, measurement types (98$^{th}$ percentile); data sources: cloud and enterprise agents; and/or category: web hypertext transfer protocol (HTTP)

server. For dashboard 2, the widget configuration 256 may include information such as type: bar chart; x-axis: continents; group: by countries; metric: completion, measurement types (mean); data sources: cloud and enterprise agents; and/or category: web page load.

The generated description 258 describes information or attributes about the plurality of dashboards 112a-d in a natural language. For example, for dashboard 1, the generated description 258 may be "breakdown of response time by cloud and enterprise agent tests for HTTP server tests, showing the 98th percentile of performance over a 1 day period." For dashboard 2, the generated description 258 may be "completion time of cloud and enterprise agent tests by country for the assessment of page load health across different continents".

The summary generation process 200 further involves at 264, providing the metadata 250 with the natural language summaries to a metadata datastore (not shown) such as the metadata storage 130 of FIG. 1 for storage and use e.g., by the LLM 150 of FIG. 1.

Figure 3:
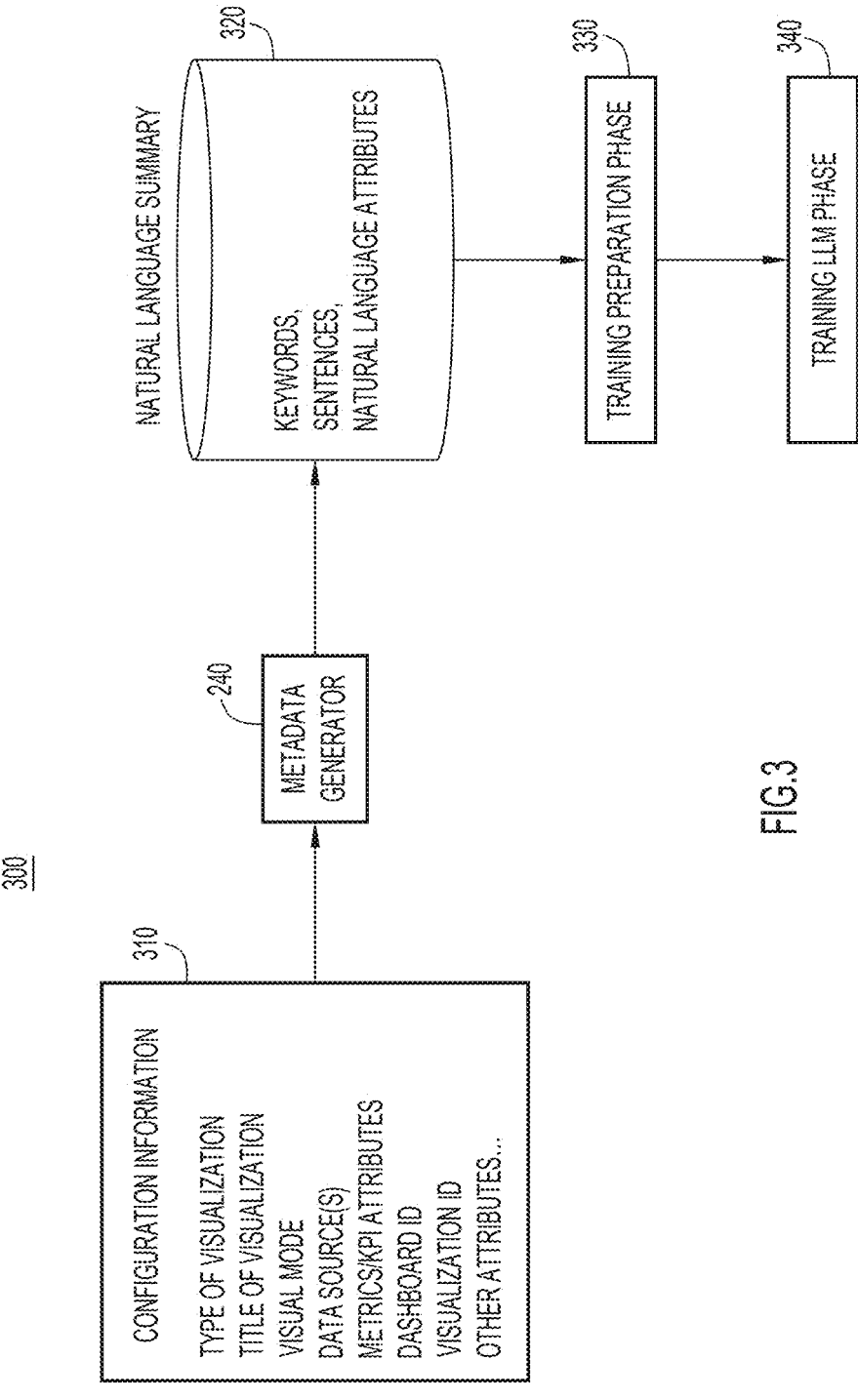
FIG. 3 is a diagram illustrating a process in which metadata is generated to include the natural language summary and is processed for training the large language model, according to an example embodiment.
Figure 4:
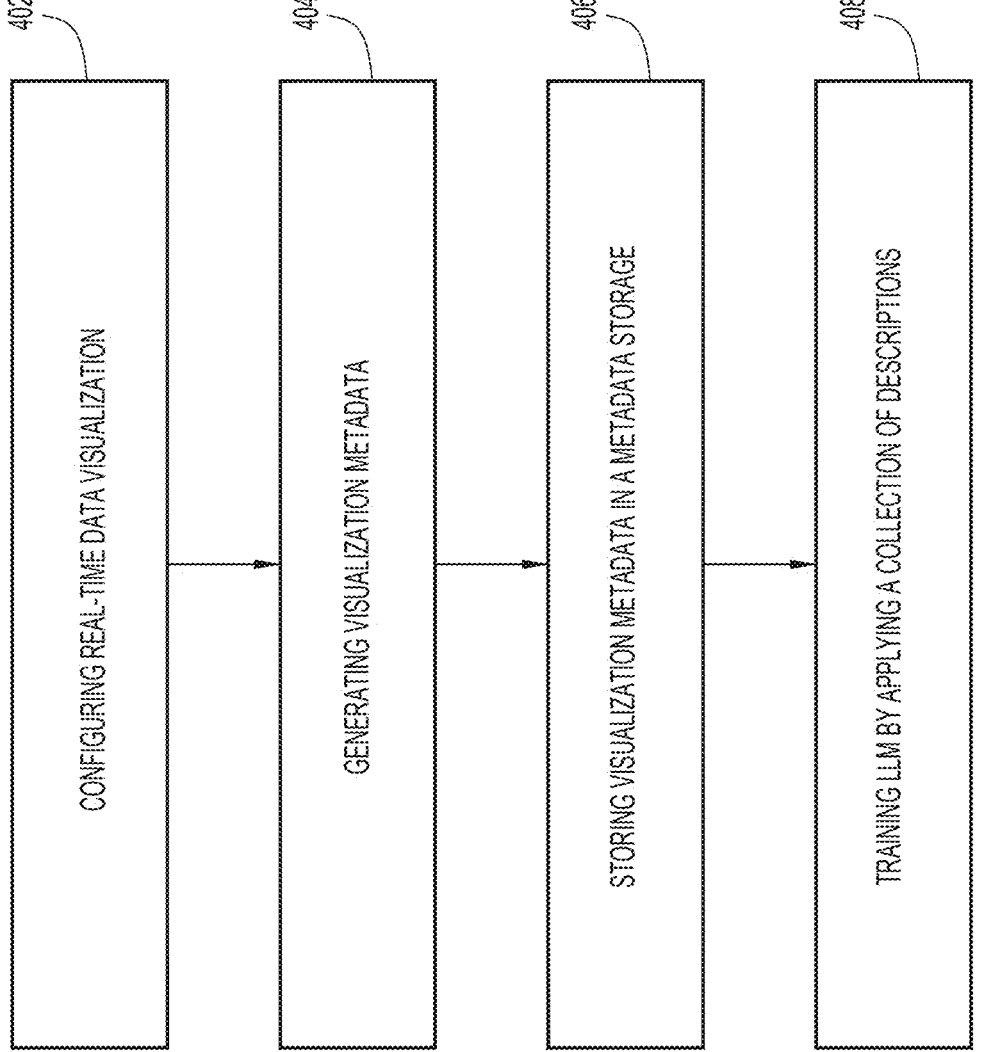
FIG. 4 is a flowchart illustrating a configuration process in which a training data set having natural language summaries is generated and used for training the large language model, according to an example embodiment.

With continued reference to FIGS. 1 and 2, FIG. 3 is a diagram illustrating a process 300 in which metadata is generated to include the natural language summary and the metadata is processed for training the LLM, according to an example embodiment. In the process 300, the metadata generator 240 translates or transforms configuration information 310 into a natural language summary 320. The process 300 further involves a training preparation phase 330 and a training LLM phase 340.

The configuration information 310 may be in a format of standard text-based format for representing structured data such as JavaScript Object Notation (JSON) form. The configuration information 310 may include a type of visualization, title of visualization, visual mode, data sources (identification, type, location), metrics or KPI attributes (latency metrics to a network-related issue, mean or percentile, etc.), dashboard ID, real-time data visualization ID, other attributes.

For example, configuration information 310 may be as follows:

```
{
  {
  "type": "Time Series Line",
  "title": "Latency",
  "visualMode": "Half screen",
  "dataSource":
  "CLOUD_AND_ENTERPRISE_AGENTS",
  "metricGroup": "AGENT_TO_SERVER",
  "metric": "NET_LATENCY",
  "measure": {
  "type": "MEAN"
  }
  "shouldExcludeAlertSuppressionWindows": true,
  "showTimeseriesOverallBaseline": false,
  "groupBy": "TEST",
  "IsTimeseriesOneChartPerLine": false
  }
  "widgetID": "zzzzzz"
  "dashboardID": "yyyyyy"
  aId: "xxxx"
  }
```

The metadata generator 240 analyzes the configuration information 310 and generates the natural language summary 320. The natural language summary 320 includes keywords, sentences, and natural language attributes i.e., human language description of the configuration information 310. For example, the natural language summary 320 may be as follows:

"This timeseries, called 'Latency' shows the average network latency for agent to server tests run on cloud and enterprise agents for all tests accessible to the account group 'Lead Admin' in an enterprise ABC. Any user in the enterprise ABC may view this visualization."

The process 300 may further involve the training preparation phase 330. In the training preparation phase 330, the natural language summary 320 is combined with other metadata to form a table such as the metadata 250 of FIG. 2. That is, the natural language summary 320 is combined with other metadata including a location of the respective real-time data visualization to form a training data set for training the LLM 150 of FIG. 1.

The process 300 further involves the training LLM phase 340. In the training LLM phase 340, the LLM is trained based on the natural language summaries to find matching real-time data visualization(s) via a feedback loop. That is, in the training LLM phase 340, LLM is applied to the natural language summaries to learn them and natural language variations thereof. The LLM is trained to output the relevant real-time data visualizations in a preset output format. For example, the LLM is trained to match user input to the natural language summary 320 to output an URL of the respective real-time data visualization.

With continued reference to FIGS. 1-3, FIG. 4 is a flowchart illustrating a configuration process 400 in which a training data set having natural language summaries is generated and used for training a large language model, according to an example embodiment. The configuration process 400 may involve entities such as the dashboarding platform 110 of FIGS. 1 and 2 and the metadata generator 240 of FIGS. 1-3.

The configuration process 400 involves at 402, configuring a real-time data visualization. For example, a user may be creating a new real-time data visualization e.g., the new real-time data visualization 116 of FIG. 1.

The configuration process 400 further involves at 404, generating visualization metadata. Examples of generating visualization metadata are described in FIGS. 2 and 3.

The configuration process 400 further involves at 406, storing visualization metadata in a metadata storage e.g., a descriptions corpus. The configuration process 400 further involves at 408, training the LLM by applying a collection of descriptions. That is, the LLM is applied to a training data set that includes a collection of natural language summaries to learn them and variations thereof and output matching real-time data visualizations (using a feedback loop or an iterative training process). As such, the LLM is trained using the natural language summaries in the visualization metadata.

With continued reference to FIGS. 1-4, FIG. 5 is a diagram illustrating a system 500 configured to output selected existing real-time data visualization by applying a large language model to a natural language query, according to an example embodiment. The system 500 includes the dashboarding platform 110 of FIGS. 1-3 which further includes a user interface having a search box 510 and a prompt engineering tool 520 that generates prompts 522. The system 500 further includes the LLM 150 of FIG. 1 that outputs search results 530.

Using the search box 510 in the dashboarding platform 110, users input their search query i.e., at 550, user asks a question. The search query is input in a natural language format.

The prompt engineering tool 520 processes the search query. Specifically, at 552, the prompt engineering tool 520 determines whether the user question is appropriate e.g., whether the natural language query is a network-related issue or a network-related problem. If a natural language query is unrelated to the output the LLM 150 was trained to provide, then an error is output. For example, if the user query is "show today's weather", at 554, no results are shown.

On the other hand, if the search query is determined to be relevant e.g., the network-related issue or troubleshooting a network problem, the prompt engineering tool 520 generates prompts 522 for the LLM 150 based on the search query. The prompts 522 include instructions for the LLM 150.

The instructions may specify the output format e.g., a list of URLs for relevant real-time data visualizations or display the relevant real-time data visualizations. The instructions may further specify user access level. For example, the user may view real-time data visualizations that are accessible to their enterprise (enterprise wide access level) and user specific access level (e.g., an administrator user access level, a troubleshooter access level, security engineer access level, general user access level, etc.). The instructions may further specify that the list of URLs should be ranked by relevance i.e., the degree of match between natural language summary of the real-time data visualization and the search query. In one example embodiment, the instructions may further specify maximum number of real-time data visualizations to display and may specify degree of relevance e.g., only URLs linked to the natural language summaries that are at least 65% match are to be displayed to the user. For example, a prompt may be "provide a list of URLs of real-time data visualizations that are accessible to the user and rank them by relevant to 'the search query'".

At 556, the generated prompt is input into the LLM 150. The LLM 150 processes the prompt and selects existing real-time data visualizations that match the search query. That is, the LLM 150 learns the search query including keywords, sentences, and natural language attributes therein. The LLM 150 then extracts the natural language summaries from the metadata datastore (not shown) and selects data records of the real-time data visualizations that match the search query.

At 558, the LLM 150 generates a list of URLs of relevant existing real-time data visualizations and at 560, prioritizes this list of URLs based on degree of matching with the search query. For example, an existing real-time data visualization that is a 90% match with the search query is displayed on top of the list and an existing real-time data visualization that an 80% match with the search query is displayed last. The LLM 150 provides the search results 530 to the dashboarding platform 110 for display to a user i.e., on a user interface. In one example embodiment, the search results 530 may involve rendering the selected existing real-time data visualizations in the dashboarding platform instead of the list of URLs.

With continued reference to FIGS. 1-5, FIG. 6 is a view illustrating a user interface 600 displaying search results 610 that identify existing real-time data visualizations selected by a trained large language model based on a natural language query, according to an example embodiment. The search results 610 is an example of the search results 530 of FIG. 5.

The search results 610 includes a plurality of URLs 612*a-n* that identity access information for selected existing real-time data visualizations. The selected existing real-time data visualizations include one or more of graphs, charts, or images. Each existing real-time data visualization may depict telemetry data related to the performance of an enterprise network or the at least one enterprise service.

The techniques presented herein allow users to find relevant existing real-time data visualizations based on a natural language rendering of configuration settings. A human-language set of metadata translates configuration settings to sentences, which surfaces because of natural language queries. Further, the techniques presented herein provide existing real-time data visualizations based on user access level.

The techniques presented herein allow users to ask questions in a natural language in the dashboarding platform and obtain relevant existing real-time data visualizations for their network-related problems from the generated natural language summaries across all real-time data visualizations from among pre-existing dashboards and real-time data visualizations. The AI or machine learning model applies the generated natural language summaries and other textual hints from the metadata to find matches with the natural language user query. The AI or machine learning model is thus able to identify specific existing visualization that is most likely to be relevant to user queries.

The techniques presented herein allow users to obtain a dashboard from various existing real-time data visualizations instead of creating new real-time data visualizations and/or new dashboards. Further, the techniques presented herein allow users to quickly retrieve relevant real-time data visualizations that are most relevant to the natural language user query without any image recognition techniques.

While one or more example embodiments are described with respect to network-related problems and troubleshooting, the disclosure is not limited thereto. Moreover, while one or more example embodiments are described with respect to user inputs, the disclosure is not limited thereto. The techniques presented herein may be applied to machine-to-machine interactions e.g., between two servers, backend applications, etc.

FIG. 7 is a flowchart illustrating a computer-implemented method 700 of providing one or more real-time data visualizations selected from a plurality of real-time data visualizations using artificial intelligence or machine learning model based on a natural language query, according to an example embodiment. The computer-implemented method 700 may be performed by a computing device of FIG. 8 such as a server, a group of servers, or in a cloud. The computer-implemented method 700 may be performed by one or more entities of the system 100 depicted in FIGS. 1-3 or one or more entities of the system 500 depicted in FIG. 5 and/or one or more other entities described in example embodiments above.

The computer-implemented method 700 involves at 702, obtaining one or more real-time data visualizations indicative of the performance of the at least one enterprise service.

The computer-implemented method 700 further involves at 704, selecting one or more real-time data visualizations from a plurality of existing real-time data visualizations by applying artificial intelligence or machine learning model to the natural language query.

The computer-implemented method 700 further involves at 706, providing the one or more real-time data visualizations indicative of the performance of the at least one enterprise service.

In one form, the computer-implemented method 700 may further involve performing at least one configuration action to an enterprise network based on the one or more real-time data visualizations. The at least one configuration action may relate to a network-related issue.

In one instance, the one or more real-time data visualizations may include a plurality of real-time data visualizations.

The computer-implemented method 700 may further involve generating a dashboard that includes the plurality of real-time data visualizations. The operation 706 of providing the one or more real-time data visualizations may include providing the dashboard for troubleshooting a network-related issue.

In another form, the operation 704 of selecting the one or more real-time data visualizations may involve generating a prompt that includes a user access level and an output format based on the natural language query and inputting the prompt into the artificial intelligence or machine learning model.

According to one or more example embodiments, the artificial intelligence or machine learning model may be a large language model. The operation 704 of selecting the one or more real-time data visualizations may involve the large language model selecting each of the one or more real-time data visualizations that matches the natural language query based on a natural language summary in the metadata of a respective existing visualization from the plurality of existing real-time data visualizations.

In yet another form, the computer-implemented method 700 may involve training the artificial intelligence or machine learning model based on metadata of the plurality of existing real-time data visualizations. The metadata may involve a natural language summary for a respective existing real-time data visualization.

In one instance, the natural language summary may be generated based on configuration information of the respective existing real-time data visualization and user-provided settings for the respective existing real-time data visualization.

In another instance, the metadata may involve an identifier, a location, and a type of the respective existing real-time data visualization and the configuration information of the respective existing real-time data visualization.

In yet another instance, the natural language summary may include keywords, sentences, and natural language attributes of the respective existing real-time data visualization. The natural language summary may be generated in response to creating the respective existing real-time data visualization.

According to one or more example embodiments, the computer-implemented method 700 may further involve obtaining metadata of the plurality of existing real-time data visualizations from one or more datastores.

According to one or more example embodiments, the plurality of existing real-time data visualizations may include one or more of graphs, charts, or images. Each visualization may depict telemetry data related to the performance of an enterprise network or the at least one enterprise service. The telemetry data may be obtained from a plurality of monitoring agents that execute synthetic tests with respect to the at least one enterprise service.

Figure 5:
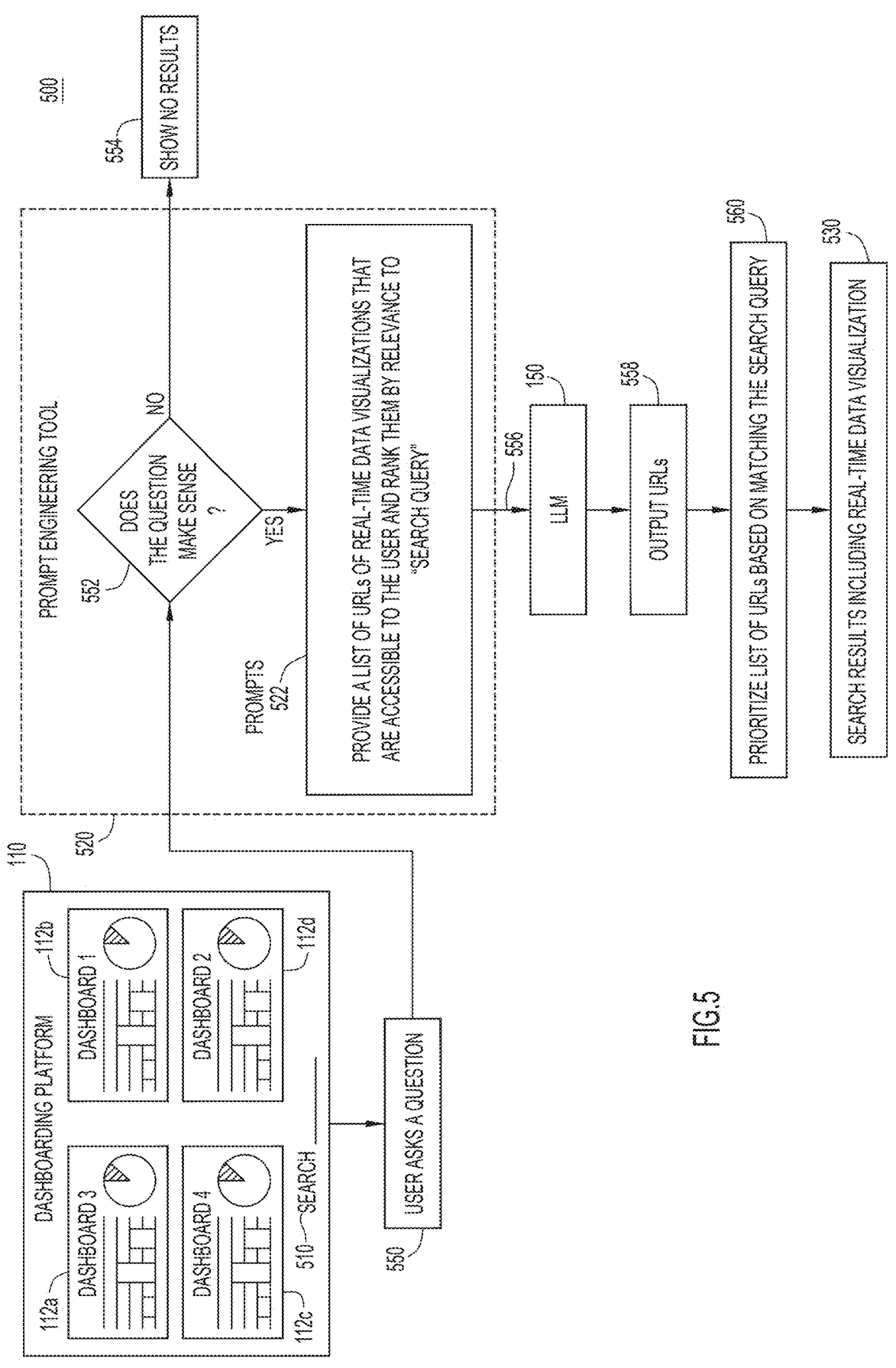
FIG. 5 is a diagram illustrating a system configured to output selected existing real-time data visualization by using the large language model and based on a natural language query, according to an example embodiment.
Figure 6:
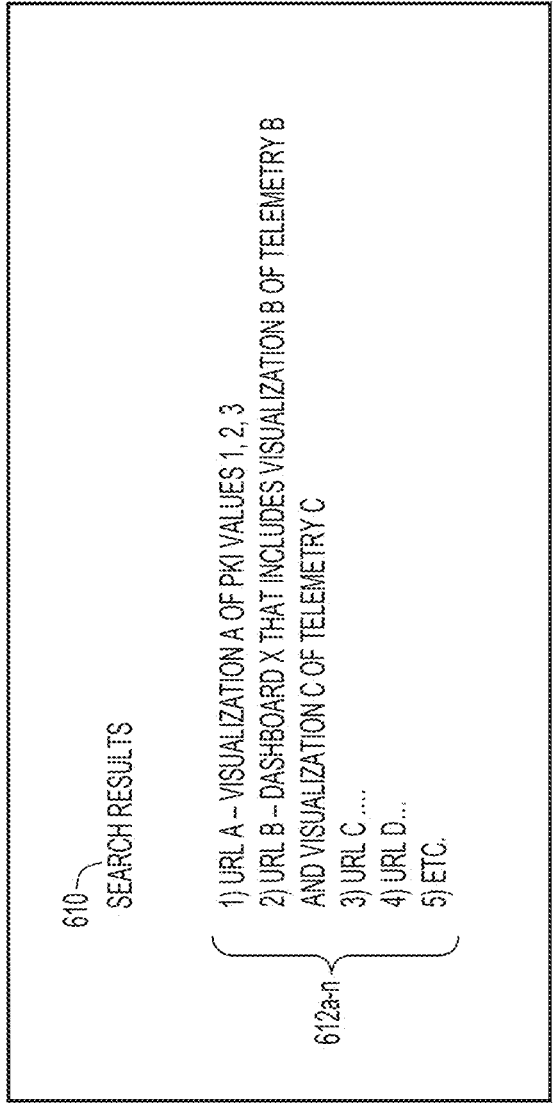
FIG. 6 is a view illustrating a user interface displaying search results that identify real-time data visualizations selected by a trained large language model based on a natural language query, according to an example embodiment.
Figure 8:
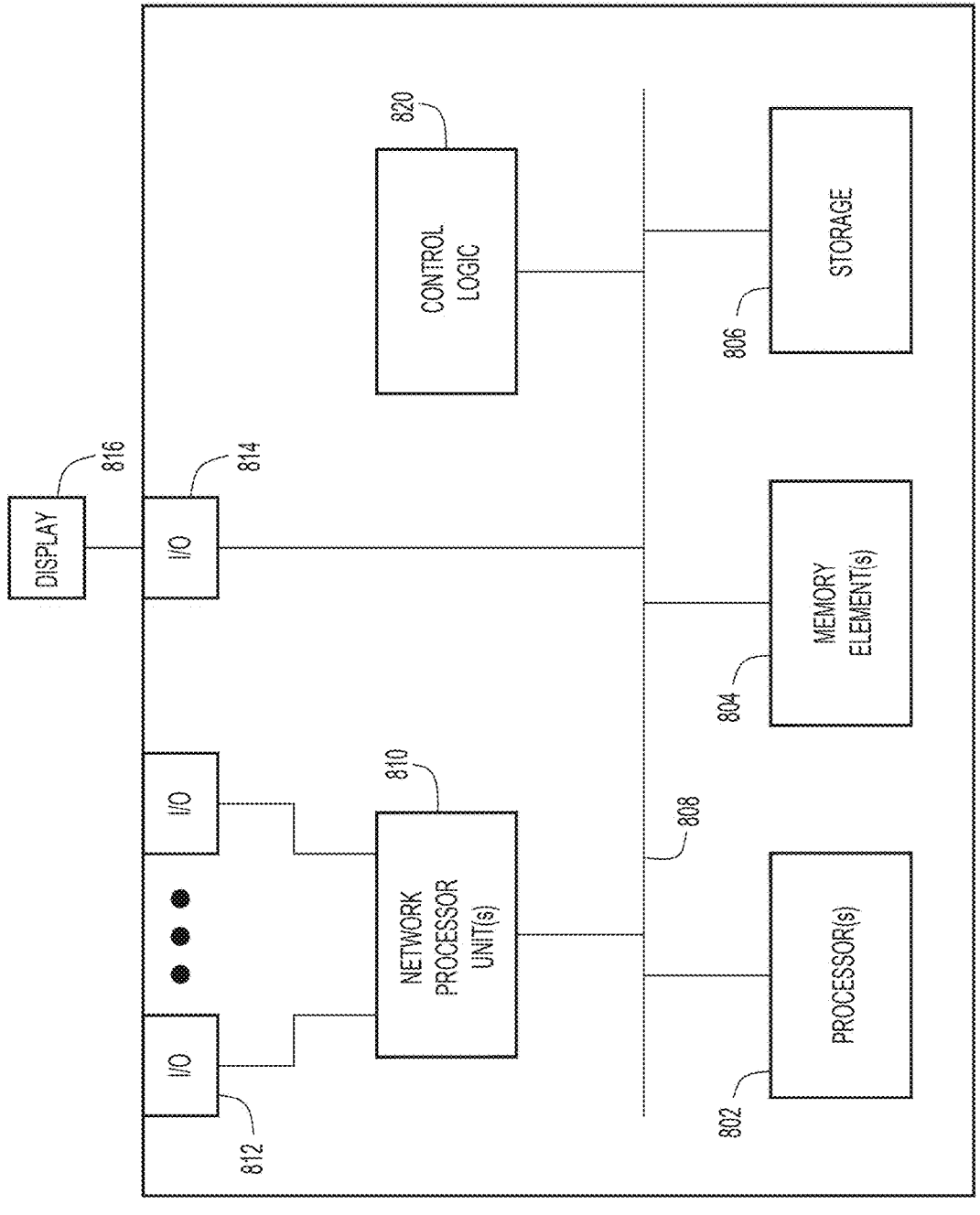
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the computing device or one or more servers that execute one or more entities of the system 100 of FIG. 1 (e.g., the dashboarding platform 110, the natural language metadata generator 140, and/or the LLM 150), the metadata generator 240 of FIGS. 2 and 3, one or more entities of the system 500 of FIG. 5 (e.g., the dashboarding platform 110 and/or the LLM 150).

Further, the computing device 800 may be representative of an apparatus such as one of the network devices, network/computing equipment, hardware asset, user equipment, or user device. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various example embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various example embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 816 such as a computer monitor, a display screen, or the like.

In various example embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor of the apparatus is configured to perform a method including obtaining a natural language query related to performance of at least one enterprise service. The method further includes selecting one or more real-time data visualizations from a plurality of existing real-time data visualizations by applying artificial intelligence or machine learning model to the natural language query and providing the one or more real-time data visualizations indicative of the performance of the at least one enterprise service.

In yet another example embodiment, one or more non-transitory computer readable storage media encoded with instructions are provided. When the media is executed by a processor, the instructions cause the processor to execute a method that involves obtaining a natural language query related to performance of at least one enterprise service. The method further includes selecting one or more real-time data visualizations from a plurality of existing real-time data visualizations by applying artificial intelligence or machine learning model to the natural language query and providing the one or more real-time data visualizations indicative of the performance of the at least one enterprise service.

In yet another example embodiment, a system is provided that includes the devices or apparatuses and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   obtaining a natural language query related to performance of at least one enterprise service in an enterprise network or of the enterprise network;

selecting one or more real-time data visualizations from a plurality of existing real-time data visualizations by applying an artificial intelligence or machine learning model to the natural language query; and providing the one or more real-time data visualizations indicative of the performance of the at least one enterprise service in the enterprise network or of the enterprise network.

2. The computer-implemented method of claim 1, further comprising:

performing at least one configuration action to the enterprise network or troubleshooting the enterprise network based on the one or more real-time data visualizations, wherein the at least one configuration action or troubleshooting relates to a network-related issue indicated by the performance of the at least one enterprise service in the enterprise network or of the enterprise network in the one or more real-time data visualizations.

3. The computer-implemented method of claim 2, wherein the one or more real-time data visualizations include a plurality of real-time data visualizations, and further comprising:

generating a dashboard that includes the plurality of real-time data visualizations, wherein providing the one or more real-time data visualizations includes providing the dashboard for troubleshooting the network-related issue.

4. The computer-implemented method of claim 1, wherein selecting the one or more real-time data visualizations includes:

generating a prompt that includes a user access level and an output format based on the natural language query; and inputting the prompt into the artificial intelligence or machine learning model.

5. The computer-implemented method of claim 4, wherein the artificial intelligence or machine learning model is a large language model, and selecting the one or more real-time data visualizations includes:

selecting, by the large language model, each of the one or more real-time data visualizations that matches the natural language query based on a natural language summary in metadata of a respective existing visualization from the plurality of existing real-time data visualizations.

6. The computer-implemented method of claim 1, further comprising:

training the artificial intelligence or machine learning model based on metadata of the plurality of existing real-time data visualizations, wherein the metadata includes a natural language summary for a respective existing real-time data visualization.

7. The computer-implemented method of claim 6, wherein the natural language summary is generated based on configuration information of the respective existing real-time data visualization and user-provided settings for the respective existing real-time data visualization.

8. The computer-implemented method of claim 7, wherein the metadata further includes an identifier, a location, and a type of the respective existing real-time data visualization and the configuration information of the respective existing real-time data visualization.

9. The computer-implemented method of claim 6, wherein the natural language summary includes keywords, sentences, and natural language attributes of the respective existing real-time data visualization and wherein the natural language summary is generated in response to creating the respective existing real-time data visualization.

10. The computer-implemented method of claim 1, further comprising:

obtaining metadata of the plurality of existing real-time data visualizations from one or more datastores.

11. The computer-implemented method of claim 1, wherein the plurality of existing real-time data visualizations include one or more of graphs, charts, or images, each depicting telemetry data related to the performance of the enterprise network or the at least one enterprise service in the enterprise network, and the telemetry data is obtained from a plurality of monitoring agents that execute synthetic tests with respect to the at least one enterprise service.

12. An apparatus comprising:

a memory;

a network interface configured to enable network communications; and a processor, wherein the processor is configured to perform a method comprising:

obtaining a natural language query related to performance of at least one enterprise service in an enterprise network or of the enterprise network;

selecting one or more real-time data visualizations from a plurality of existing real-time data visualizations by applying an artificial intelligence or machine learning model to the natural language query; and providing the one or more real-time data visualizations indicative of the performance of the at least one enterprise service in the enterprise network or of the enterprise network.

13. The apparatus of claim 12, wherein the processor is further configured to perform:

performing at least one configuration action to the enterprise network or troubleshooting the enterprise network based on the one or more real-time data visualizations, wherein the at least one configuration action or troubleshooting relates to a network-related issue indicated by the performance of the at least one enterprise service in the enterprise network or of the enterprise network in the one or more real-time data visualizations.

14. The apparatus of claim 12, wherein the one or more real-time data visualizations include a plurality of real-time data visualizations, and the processor is further configured to perform:

generating a dashboard that includes the plurality of real-time data visualizations, wherein providing the one or more real-time data visualizations includes providing the dashboard for troubleshooting a network-related issue.

15. The apparatus of claim 12, wherein the processor is configured to select the one or more real-time data visualizations by:

generating a prompt that includes a user access level and an output format based on the natural language query; and inputting the prompt into the artificial intelligence or machine learning model.

16. The apparatus of claim 15, wherein the artificial intelligence or machine learning model is a large language model, and the processor is further configured to select the one or more real-time data visualizations by:

selecting, by the large language model, each of the one or more real-time data visualizations that matches the natural language query based on a natural language summary in metadata of a respective existing visualization from the plurality of existing real-time data visualizations.

17. One or more non-transitory computer readable storage media encoded with software comprising computer executable instructions that, when executed by a processor, cause the processor to perform a method including:

obtaining a natural language query related to performance of at least one enterprise service in an enterprise network or of the enterprise network;

selecting one or more real-time data visualizations from a plurality of existing real-time data visualizations by applying an artificial intelligence or machine learning model to the natural language query; and providing the one or more real-time data visualizations indicative of the performance of the at least one enterprise service in the enterprise network or of the enterprise network.

18. The one or more non-transitory computer readable storage media according to claim 17, wherein the computer executable instructions cause the processor to perform at least one configuration action to the enterprise network or troubleshooting the enterprise network based on the one or more real-time data visualizations, wherein the at least one configuration action or troubleshooting relates to a network-related issue indicated by the performance of the at least one enterprise service in the enterprise network or of the enterprise network in the one or more real-time data visualizations.

19. The one or more non-transitory computer readable storage media according to claim 17, wherein the one or more real-time data visualizations include a plurality of real-time data visualizations and wherein the computer executable instructions cause the processor to perform:

generating a dashboard that includes the plurality of real-time data visualizations, wherein the computer executable instructions cause the processor to provide the one or more real-time data visualizations by providing the dashboard for troubleshooting a network-related issue.

20. The one or more non-transitory computer readable storage media according to claim 17, wherein the computer executable instructions cause the processor to select the one or more real-time data visualizations by:

generating a prompt that includes a user access level and an output format based on the natural language query; and inputting the prompt into the artificial intelligence or machine learning model.

\*    \*    \*    \*    \*